United States Patent [19]

Grant et al.

[11] Patent Number: 4,726,841
[45] Date of Patent: Feb. 23, 1988

[54] EXTRACTION OF METALS

[76] Inventors: Richard A. Grant, 68 Grove Hill, Caversham; Barry A. Murrer, both of Reading, United Kingdom

[21] Appl. No.: 881,963

[22] Filed: Jul. 3, 1986

[30] Foreign Application Priority Data

Jul. 4, 1985 [GB] United Kingdom ............... 8516911

[51] Int. Cl.⁴ ............................................. C22B 11/04
[52] U.S. Cl. ................................. 75/101 BE; 75/117; 75/118 R; 75/119; 75/121; 423/22; 423/24; 423/87; 423/139; 423/508; 210/684; 210/685; 210/688
[58] Field of Search ................... 75/101 BE, 108, 117, 75/118 R, 119, 121; 423/22, 24, 42, 87, 139, DIG. 14, 140; 210/508, 660, 702, 684, 685, 688

[56] References Cited

U.S. PATENT DOCUMENTS 3,033,675  5/1962  Hedley ........................... 75/118 R
3,565,608  2/1971  Anspon .......................... 75/118 R
3,817,745  6/1974  Copes et al. ...................... 75/108

*Primary Examiner*—Robert L. Stoll
*Attorney, Agent, or Firm*—Cushman, Darby & Cushman

[57] ABSTRACT

A solvent extraction process for the separation of one or more precious metal species from other precious metal species and possibly also base metal species contained in an aqueous acidic solution of the type produced during the recovery of precious metals from ore or scrap in which the solvent contains an extractant which is a mono-N-substituted amide. Also a mono-N-substituted amide extractant. The extractant permits better separation factors generally and also enables platinum to be extracted before palladium and permits improved extraction of iridium from rhodium.

9 Claims, No Drawings

EXTRACTION OF METALS

This invention relates to an organic solvent extraction process for the separation of at least one precious metal species from a mixture of precious metal species and possibly also base metal species contained in an aqeuous acidic phase in which the solvent used in the process contains an extractant which enables solvent extraction to occur. The invention also relates to an extractant for use in the process.

An extractant is an organic compound which increases the so-called "separation factor" or "$\beta$" for two metal species, and $\beta$ is defined as:

$$\beta = \frac{D_A{}^O \text{ for a first metal species}}{D_A{}^O \text{ for second metal species}}$$

where $D_A{}^O$ is the distribution coefficient for the metal species, that is to say $$D_A{}^O = \frac{[M] \text{ (organic phase)}}{[M] \text{ (aqueous phase)}}$$

where [M] is the concentration of the metal species in a particular phase. A high distribution coefficient indicates that the metal species extracts well into the organic phase in the presence of aqueous phase. Conversely a low distribution coefficient indicates that the metal phase is retained well by the aqueous phase during solvent extraction. For efficient separation, the separation factor, $\beta$, should preferably exceed 15 and the distribution coefficient $D_A{}^O$ of a species which is to be predominantly retained by the aqueous acidic phase should be preferably less than 1.

Precious metals are gold and silver and metals of the platinum group, that is to say platinum, ruthenium, rhodium, palladium, osmium and iridium.

At least one commercially important process for the recovery of precious metals from their ores or from scrap material produces an aqueous solution containing species of a mixture of precious metals and possibly also species of base metals. For example one process for the recovery of platinum group metals from ore produced an aqueous solution containing species of all six platinum group metals plus minor amounts of species of iron, copper, nickel, selenium, tellurium and antimony. Such aqueous solutions may be acidified (if they are not already acidic) and subjected to a solvent extraction process in which at least one of the precious metal species in the aqueous acidic phase is at least partially separated from other precious metal species and/or base metal species also in the phase by contacting the aqueous acidic phase with an organic solvent phase containing an extractant. For example, British patent specification GB No. 1 497 535 describes the organic solvent extraction of palladium species from aqueous acidic solutions of other platinum group metal species by using solvent containing an oxime extractant. This process has the disadvantage that it is the palladium which is separated first from the mixture of metal species. This is a disadvantage because the market price of platinum is sufficiently high for it to be economically worthwhile to avoid having to wait for the removal of palladium before the platinum can be liberated. In addition, there is a potential health hazard associated with some platinum species which make it desirable to remove platinum species from a commercial separation process as soon as possible.

British patent specification GB No. 1 495 931 describes the organic solvent extraction of platinum and iridium species from an aqueous acidic solution also containing rhodium species by using a solvent containing a tertiary amine extractant such as the mixture of tertiary amines known as "Alamine" 336 and now supplied by Henkel. Such a separation cannot be performed satisfactorily in the presence of palladium species and so it too has the disadvantage of requiring the liberation of platinum to await the removal of palladium species. There is also a need for an extractant which achieves a better separation factor in the separation of iridium species from rhodium species and for an extractant which is more resistant to oxidation.

Many possible alternative extractants have been investigated for the separation of precious metals. For example. Casey et al. ("Solvent Extraction Chemistry", Proceedings of the International Conference at Goteburg in 1966 see pages 327 and 334) reported the use of tributyl phosphate as an extractant in the organic solvent extraction of platinum species from a mixture of platinum and palladium species in an aqueous acidic phase. Although platinum species are extracted first, only a low separation factor of about 8 can be achieved.

An object of the present invention is to provide an improved organic solvent extraction process for the separation of at least one precious metal species from a mixture of other precious metal species and/or base metal species by using a solvent which contains an improved extractant and especially one that permits a high separation into the organic phase of platinum species from a mixture of platinum and palladium species in an aqueous acidic phase and/or a high separation of iridium species from a mixture of iridium and rhodium species in the phase. It is also an object of the invention to provide an extractant.

Accordingly this invention provides an organic solvent extraction process for the separation of precious metal species in which precious metal species which is to be separated and which is contained in an aqueous acidic phase is at least partially separated from other precious metal species and/or base metals species also contained in the phase by contacting the aqueous acidic phase with an organic solvent phase and wherein the organic solvent phase also contains an extractant which is a mono-N-substituted amide.

The mono-N-substituted amide is preferably predominantly insoluble in the aqueous acidic phase and preferably predominantly soluble in the organic solvent phase. The amide has the formula R'—CO—NH—R and in particular it contains the moiety

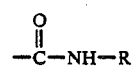

which it is presumes protonates in the presence of aqueous acid to form either

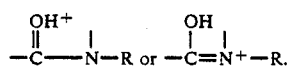

It is believed that the protonated amide interacts to form a strong ion pair with the precious metal species to be separated so promoting its extraction into the organic solvent phase. When the organic solvent phase is removed from contact with the aqueous acidic phase and contacted instead with a less acidic aqueous phase, or preferably water or an aqueous phase having a pH of above 7, the protonation is lost and separated precious metal species can be recovered from the organic phase into the less acid phase from where the precious metal is easily liberated. Accordingly it is a further advantage of the process of this invention that the separated precious metal species can be easily recovered from the organic phase by contacting the phase with a less acid phase.

In the amide, R' and R may be the same or different and they can be for example straight chain alkyl, branched alkyl, alicyclic, aralkyl or aryl groups which preferably contain at least six carbon atoms. R' is preferably an alkyl group containing 8 to 25 carbon atoms and iso-alkyl groups are especially preferred provided that the group does not contain a tertiary α carbon atom.

An especially preferred class of mono-N-substituted amides have the formula R''—CO—NH—R''' in which the R'' group is a branched chain alkyl group having from 8 to 25 carbon atoms and the R''' group is a substituted or unsubstituted straight chain, branched chain or cyclic alkyl group having from 3 to 18 carbon atoms or an aralkyl or aryl group. Preferably any substituent in an aromatic group is an alkyl group and an aryl or aralkyl group contains not more than 18 carbon atoms.

Examples of useful amides include:
(1) N-(n-octyl)n-octanamide
(2) N-(isononyl)n-decanamide This is made using so-called isononylamine which is a mixture of branched chain amines contaning 9 carbon atoms and it is predominantly 3,5,5 trimethylhexylamine.

(3) N-(n/iso-tridecyl)n-dodecanamide

A proprietary amide sold as "Synprolam" 35A by ICI.

(4) N-(n-octyl)isodecanamide

This amide is made using so-called isodecanoic acid which is a mixture of acids containing 10 carbon atoms and chain branching in the alkyl moiety. Isodecanoic acid is predominantly a mixture of trimethyl heptanoic and dimethyl octanoic acids.

(5) N-(n-octyl)isotridecanamide

This amide is made using so-called isotridecanoic acid which is a mixture of acids containing 13 carbon atoms and chain branching in the alkyl moiety of the acid. Isotridecanoic acid is made by the hydroformylation of the tetramerised propylene.

(6) N-(isononyl)isotridecanamide

The amide moiety is made as in 5 above and the isononyl group is made using so-called isononylamine which is a mixture of branched chain amines each containing 9 carbon atoms.

(7) N-(isotridecyl)isotridecanamide

The amide moiety is made as in 5 above and the isotridecyl group is made using a proprietary isotridecylamine sold by Badische Analin and Sodafabrik and which is a mixture of branched chain amines each containing β carbon atoms.

(8) N-(1,6-dimethylhexyl)isotridecanamide

The amide moiety is made as in 5 above.

(9) N-(1-methylheptyl)isotridecanamide

The amide moiety is made as in 5 above.

(10) N-(2,3-dimethylcyclohexyl)isotridecanamide

The amide moiety is made as in 5 above.

(11) N-(4-methylphenyl)isotridecanamide

The amide is made as in 5 above.

(12) N-(n-octyl)iso-octadecanamide

The amide moiety is made from isooctadecanoic acid, details of which are given under Table 1.

(13) N-(n-octyl)tertiarynonanamide

The amide is made from a proprietary acid containing 9 carbon atoms and sold as "Versatic" 9.

The above amides are conveniently prepared by forming the acid chloride of the carboxylic acid and reacting it with an amine in the presence of a base.

Accordingly this invention also provides an extractant which has good stability to oxidation, which is a mono-Nsubstituted amide, which is not made from isostearic acid and which has the general formula

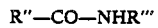

where R'' is a branched chain alkyl group containing from 8 to 25 carbon atoms and R''' is a hydrocarbon group containing from 3 to 18 carbon atoms and preferably is a straight or branched chain alkyl group, a cycloalkyl group or an aromatic group provided that amides having an R'' moiety derived from isostearic acid are excluded. Isostearic acid is a branched chain isomer of stearic acid of the formula $C_{17}H_{35}COOH$ having primarily methyl branching, for example "Emersol" 871 (Emery Industries).

A wide range of solvents are commonly used in solvent extraction processes and the process of this invention may use any organic solvent provided it can safely receive the ion pair comprising the separated metal species and the extractant.

Suitable solvents include aromatic petroleum solvents such as "Solvesso" 150 or ketones such as 2,6-dimethyl-4-heptanone. The extractant is preferably used in the solvent in a concentration of from 0.1 to 5 molar and especially in concentrations below 3 molar. A concentration of 0.5 to 1 molar is most preferred. The solutions are ideally suited for use on an industrial scale especially in a continuous countercurrent extraction, for example in what is known as a mixer-settler plant. The organic solvent may also include known solvent extraction modifiers such as alcohols, phenols or organic phosphates (for example tributylphosphate) which lower the viscosity of the solvent phase or enhance separation of the solvent phase from the aqueous phase.

The process of this invention is suitable for extracting platinum, iridium and osmium species having an oxidation state of 4, gold of oxidation state 3 and ruthenium having whatever oxidation state exists in the compound ruthenium nitrosyl chloride, $[RuCl_5NO]^{2-}$. (The oxidation state of $[RuCl_5NO]^{2-}$ is uncertain). The process enables platinum of oxidation state 4 to be extracted from aqueous acidic solutions in preference to palladium of oxidation state 2 and it achieved a higher separation factor in the separation of iridium of oxidation state 4 from the presence of rhodium (oxidation state 3) in aqueous acidic solutions. The process may be used to separate platinum species (oxidation state 4) from iridium, osmium and ruthenium species in which case it is usual to treat the aqueous acidic solution with a mild reducing agent which largely unaffects the platinum species but which ensures that iridium, osmium and ruthenium species are present in an oxidation state of 3. Suitable mild reducing agents are acetone or methyl isobutylketone.

The aqueous phase which contains the species from which precious metal species is to be separated is preferably acidic by virtue of the presence of hydrochloric acid which is prefereably present in a concentration of from 3 to 12 molar and usually not more than 9 molar so as to minimise the distribution coefficient, $D_A^O$ of one or more of the species intended to be predominantly retained by the aqueous acidic phase. If an aqueous solution obtained from a recovery process is not acidic, then it is easily acidified by adding hydrochloric acid prior to the start of the solvent extraction process. Alternatively excess hydrochloric acid can be removed by volatilisation. Other acids include sulphuric acid, perchloric acid and nitric acid.

The distribution coefficients of the species intended to be retained in the aqueous acidic phase are such that there will always be a small amount of the species which are unwantedly extracted into the organic solvent phase. This is particularly true for the palladium species $[PdCl_4]^{2-}$ and for certain rhodium species for example. To increase the efficiency of separation it is therefore preferred to remove the organic solvent from contact with the aqueous acidic phase after the extraction operation and then contact the solvent phase with a fresh aqeuous acid phase which is essential free from any metal species. Contact with the fresh acid phase preferentially extracts most of the unwanted metal species back from the solvent phase into the fresh aqueous acidic phase. This contact with fresh aqeuous acidic phase is known as "scrubbing" and scrubbing operations may be repeated as often as is economically worthwhile. The fresh aqueous acidic phase preferably is acidic by virtue of the presence of hydrochloric acid usually in a concentration of 3 to 9 molar. Generally the concentration of acid in the fresh phase will be about equal to that in the aqueous acidic phase which initially contains the metal species.

The precious metal species separated into the organic solvent phase can be recovered from the organic solvent phase by removing the solvent from contact with the aqueous acidic phase and then (optionally after scrubbing with fresh aqueous acidic phase) contacting the solvent phase with a less acidic aqueous phase whereupon most of the metal species in the solvent phase is extracted into the non-acidic aqueous phase. The organic solvent phase can then be separated from the non-acidic phase leaving the precious metal species in a phase from which the precious metal is easily recoverable.

The invention is further illustrated by the following Examples.

EXAMPLE 1

This Example illustrates the synthesis of an extractant according to this invention.

Isohexadecanoic acid (20 g, 0.078 mol) and thionyl chloride (7.2 ml, 0.0984 mol) were refluxed together gently for 1 hour to produce isohexadecanoyl chloride and the reaction was monitored by infra-red spectroscopy. Excess thionyl chloride was distilled away under rotary pump vacuum at reflux temperature. The acyl chloride was dissolved in n-hexane (50 ml) and slowly added to a chilled stirred solution of n-propylamine (7.05 ml, 0.0858 mol, m 0.1 excess). The solution also contained triethylamine (12 ml, 0.0858 mol, 0.1 excess) in n-hexane (200 ml) to ensure base conditions. After the addition was completed the reaction mixture was stirred at room temperature for 3 hours until all the acyl chloride was consumed. This was detected by monitoring the shift in the carbonyl frequency by infra-red spectroscopy. A product mixture was produced which consisted of N-(n-propyl)-isohexadecamide. The produce mixture was washed with water (2×200 ml), 6M hydrochloric acid (4×100 ml), water (100 ml), saturated aqueous sodium bicarbonate (1×100 ml), saturated aqueous sodium chloride (1×100 ml) and dried over $MgSO_4$ before being filtered and rotary evaporated to yield a yellow oil (22.4 g, 96.5%). Infra-red spectroscopy (liquid film) detected absorption peaks at 3280 $cm^{-1}$ (broad, strong), 3080 $cm^{-1}$ strong, 1630 $cm^{-1}$ (strong) and 1540 $cm^{-1}$ (strong).

The process according to the invention is ideally suited for operation on the industrial scale as a continuous countercurrent extraction, for example in a mixer-settler plant.

The following Examples illustrate process of the invention.

EXAMPLE 2 AND COMPARATIVE EXAMPLES A TO D

Various extractants (as listed in Table 1) were evaluated for comparative purposes against one particular mono-N-substituted amide, $C_{15}H_{31}CONH(nC_8H_{17})$, to compare their effectiveness as extractants for platinum from an aqueous acidic phase containing various concentrations of hydrochloric acid and in the presence of palladium.

The organic solvent used was "Solvesso" 150 and in the case of Examples 2, and A to C it contained a one molar concentration of the extractant and in the case of Example D it contained 1.8 molar concentration of extractant. The aqueous acidic phase contained 10 g/l of platinum species as $Na_2PtCl_6$ and 5 g/l of palladium species as $Na_2PdCl_4$. Equal volumes of the solvent and aqueous acidic phases were shaken together for two minutes and the distribution coefficients and separation factors assessed. The assessments are shown in Table 1.

TABLE 1

| | | $D_A^O$ At HCl Concentration | | | | |
| | | 4M | | 6M | | Separation |
| EXAMPLE | Extractant | Pt | Pd | Pt | Pd | Factor |
| --- | --- | --- | --- | --- | --- | --- |
| A | N-t.dodecyl acetamide | 19.6 | 4.0 | 4.4 | 1.9 | 2.3 at 6 M |
| B | isohexadecanamide | 1.2 | 0.2 | 1.8 | 0.3 | 6.0 at 6 M |
| C | N,N—diethylisohexadecanamide | — | — | <0.04 | <0.04 | Too low to detect |
| D | Tri(n-butyl)phosphate | — | — | 5.2 | 0.7 | 8.1 at 6 M |

TABLE 1-continued

| | | $D_A^O$ At HCl Concentration | | | | |
|---|---|---|---|---|---|---|
| | | 4M | | 6M | | Separation |
| EXAMPLE | Extractant | Pt | Pd | Pt | Pd | Factor |
| 2 | N—(n—octyl)isooctadecanamide | — | — | 30.3 | 0.72 | 42.1 at 6 M |

Notes:
(i) isotridecyl groups were made from "Adogen" 283 (di-isotridecylamine)
(ii) t.dodecyl groups were made from "Primene" 81R (t.dodecylamine)
(iii) isohexadecanamide was made from isohexadecanoic acid which is a mixture of branched chain acids containing 16 carbon atoms made by the aldol condensation of iso-octanal. octanal.
(iv) isooctadecanamide was made from isooctadecanoic acid which is a mixture of branched chain acids containing 18 carbon atoms made by the aldol condensation of isononanal and being predominantly 5,7,7-trimethyl-2-(1',3',3'-trimethyl butyl)-1-octanoic acid.

From Table 1 it is seen that, apart from the final compound, separation factors are not outstandingly good and the distribution coefficients for platinum are poor. The mono-Nsubstituted amide represented by the final compound gave considerably enhanced separation factors although distribution coefficients were depressed. Notwithstanding this, a high separation factor in combination with a moderate distribution coefficient for platinum is a better indication of practical utility than vice versa.

EXAMPLES 3 to 11

Various mono-N-substituted amides were evaluated as extractants under the same conditions as used in Example 2 except that in Example 6 the concentration of extractant was 0.8M.

Results are presented in Table 2.

From Table 2, it can be seen that in general on varying the R and $R^1$ groups there is a balance between extraction coefficient and separation factor, althought the compound N-(n-dodecyl)-iso-tridecanamide gave a high separation factor with a moderately high extraction coefficient for platinum, and N-(n-octyl)-n-hexadecanamide gave a higher separation factor owing to an extraction coefficient for palladium of less than unity.

TABLE 2

| | | $D_A^O$ at HCl Concentration of 6M | | Separation |
|---|---|---|---|---|
| EXAMPLE | Extractant | Pt | Pd | Factor |
| 3 | N—(n-octyl)-i-decanamide | 227.00 | 8.48 | 26.77 |
| 4 | N—(n-octyl)-i-tridecanamide | 172.00 | 4.70 | 36.6 |
| 5 | N—(n-octyl)-i-hexadecanamide | 18.00 | 0.337 | 53.4 |
| 6 | N—(n-octyl)-i-octodecanamide | 33.2 | 0.81 | 40.9 |
| 7 | N—(i-nonyl)-i-tridecanamide | 201.42 | 6.303 | 31.9 |
| 8 | N—(2,3-dimethylcyclohexyl)-i-tridecanamide | 17.69 | 0.589 | 30.5 |
| 9 | N—(1-methylheptyl)-i-tridecanamide | 42.6 | 1.306 | 32.6 |
| 10 | N—(1,5-dimethylhexyl)-i-tridecanamide | 33.82 | 1.077 | 31.4 |
| 11 | N—(4-methylbenzyl)-i-tridecanamide | 86.46 | 3.972 | 21.7 |

EXAMPLES 12 TO 16

The effect of varying the concentration of the extractant is shown in Table 3. The extractant was N-(n-octyl)iso-hexadecanamide. The other conditons were as in Example 2.

From Table 3, it is seen that extraction coefficients of both platinum and palladium increase with increasing concentration of extractant but that the separation factor varies.

EXAMPLES 17 TO 20 AND COMPARATIVE EXAMPLE E

The effect of modifiers was assessed by adding tributylphosphate (TBP) at various concentrations to the same organic phase as was used in Example 3 containing 0.667M concentration of the extractant except that for Example 20 isoheptadecyl analogue of the extractant was used instead of the n-octyl. The results obtained are shown in Table 4.

TABLE 3

| EXAMPLE | Molar Conc$^n$ of Separation Aid | $D_A^O$ (Pt) | $D_A^O$ (Pd) | β |
|---|---|---|---|---|
| 12 | 0.2 | 0.67 | 0.047 | 14.2 |
| 13 | 0.4 | 11.50 | 0.141 | 81.6 |
| 14 | 0.6 | 24.00 | 0.219 | 109.6 |
| 15 | 0.8 | 35.36 | 0.589 | 60.0 |
| 16 | 1.0 | 75.9 | 1.16 | 65.4 |

β = Separation Factor

TABLE 4

| EX-AMPLE | TBP (Vol. %) | $D_A^O$ (Pt) | $D_A^O$ (Pd) | β | Comments |
|---|---|---|---|---|---|
| E | 0 | 27.0 | 0.3 | 90 | Very viscous |
| 17 | 5 | 17.2 | 0.35 | 49.1 | Mobile, fast separation |
| 18 | 10 | 15.2 | 0.34 | 44.7 | " |
| 19 | 18.3 | 12.0 | 0.6 | 20.0 | " |
| 20 | 18.3* | 9.5 | 0.29 | 32.8 | " |

*i-$C_{17}H_{35}$ amide

EXAMPLES 21 AND 22

Two extractants, namely N-(n-octyl)-iso-hexadecanamide (Example 21) and N-(n-octyl)-iso-octadecanamide Example 22) were added to "Solvesso" 150 to produce two organic solvent phases each containing 0.67 molar concentration of one of the extractants. The organic solvent phases also contained 18.8 vol % of tributylphosphate. The organic solvent phases were then used in turn to separate platinum species from samples of an aqueous acidic phase taken from a commercial process for the recovery of precious metals from ore. The aqueous acidic phase contained species of platinum, palladium, ruthenium, iridium, gold and silver in amounts as shown in Table 5 together with certain base metal species such as species of iron, nickel, copper, selenium, lead, bismuth and antimony. The amounts of precious metal present in the aqueous acidic phase before separation are shown in Table 5. Separation was performed by shaking together equal volumes of the organic solvent phase and the aqueous acidic phase for two minutes. It was found that the distribution coefficients, $D_A^O$, for platinum species and palladium species were 9.4 and 0.41 respectively in Example 21 and 6.47 and 0.32 respectively in Example 22. The amounts of precious metal species in the aqueous acidic phase and in the organic solvent phase after separation are also shown in Table 5.

Sufficient methyl isobutyl ketone was added to the aqueous acidic phase to reduce any reduceable precious metal species other than platinum species and then platinum and palladium species were separated from the phase to an extent which left less than 20 parts per million of platinum species and less than 2 parts per million of palladium species in the phase. The osmium and ruthenium are removed by distillation. The aqueous acidic phase was then subjected to oxidation by the addition of 2.2 vol. % of 100 volume hydrogen peroxide to give the iridium species an oxidation state of 4. The

TABLE 5

| Extractant | Phase | Concentration of precious metal species: parts per million | | | | | | |
|---|---|---|---|---|---|---|---|---|
| | | Pt | Pd | Ru | Rh | Ir | Au | Ag |
| EXAMPLE 21 | Aqueous (i) before | 10732 | 7082 | 1803 | 1206 | 317 | 7 | 56 |
| N—(n-octyl)-iso | acidic (ii) after separation | 1028 | 5018 | 1871 | 1271 | 323 | 1 | 49 |
| hexadecanamide | Organic after separation | 9704 | 2064 | | | | | |
| | Scrub 1 | 593 | 1493 | 77 | 43 | 13 | 1 | 7 |
| | Scrub 2 | 496 | 599 | 7 | 2 | 1 | 0 | 0 |
| | Strip 1 | 9196 | 355 | 11 | 3 | 2 | 3 | 0 |
| | Strip 2 | 307 | 17 | 2 | 1 | 0 | 0 | 0 |
| EXAMPLE 22 | Aqueous (i) before | 11171 | 7375 | 1902 | 1267 | 330 | — | 60 |
| N—(n-octyl)-iso | acidic (ii) after separation | 1496 | 5603 | 1861 | 1252 | 323 | — | 51 |
| octadecanamide | Organic after separation | 9675 | 1772 | | | | | |
| | Scrub 1 | 740 | 1154 | 4 | 0 | 1 | — | 7 |
| | Scrub 2 | 598 | 351 | 0 | 0 | 0 | — | 1 |
| | Scrub 3 | 553 | 120 | 0 | 0 | 0 | — | 0 |
| | Scrub 4 | 511 | 42 | 0 | 0 | 0 | — | 0 |
| | Strip 1 | 7391 | 19 | 0 | 0 | 0 | — | 0 |
| | Strip 2 | 300 | 0 | 0 | 0 | 0 | — | 0 |

The organic phase was then subjected to two scrubbings by shaking for two minutes with an equal volume of a fresh aqueous acidic phase comprising only water and hydrochloric acid in a concentration of 6 molar. The concentrations of precious metal species in each fresh aqueous acidic phase after scrubbing (i.e. Scrub 1 and Scrub 2) are shown in Table 5. Two extra scrubbings (Scrub 3 and 4) were performed in Example 22.

Finally after scrubbing, the organic solvent phase was shaken for two minutes with an equal volume of clean water to extract precious metal species from the organic phase back into an aqueous phase. This process is called "stripping". Stripping was repeated with a second equal volume of clean water and the amounts of precious metal species recovered into the two volumes of water (i.e. Strip 1 and Strip 2) are shown in Table 5. Even after shaking with the solvent phase, the volumes of clean water contained only traces of base metal species even though the initial aqueous acidic phase had contained significant amounts of base metal species and especially of nickel and copper.

EXAMPLE 23

Example 23 illustrates the separation of iridium from an aqueous acidic phase taken from a commercial process for the recovery of precious metals from ore.

aqueous acidic phase substantially free of platinum, palladium, osmium and ruthenium species is subjected to the following procedure for the separation of iridium.

The aqueous acidic phase now containing mainly iridium and rhodium species was shaken for two minutes with an equal volume of an organic solvent phase which consisted of 2,6-dimethyl-4-heptanone containing N-(isotridecyl)isotridecanamide in a concentration of 0.5M. The organic solvent phase was then removed from contact with the aqueous acidic phase, filtered and then subjected to three scrubbings each performed with an equal volume of a fresh aqueous acidic phase consisting of water and hydrochloric acid in a concentration of 6M. The iridium species was then removed from the organic solvent phase by shaking the solvent phase for two minutes with a first equal volume of clean water and then with a second equal volume of clean water. The results obtained are shown in Table 6.

TABLE 6

| | Composition in parts in million of | | | |
|---|---|---|---|---|
| SPECIES | Aqueous Acidic Phase Before Separation of Ir species | Aqueous Acidic Phase After Separation of Ir species | First Volume of Clean Water | Second Volume of Clean Water |
| Ir | 4750 | 171 | 1640 | 2180 |
| Rh | 12900 | 12500 | <1 | <1 |
| Pt | <20 | <4 | 5.2 | 7.5 |
| Pd | <2 | <2 | <2 | <2 |
| Os | <10 | <10 | — | — |
| Ru | <25 | <20 | — | — |

The separation factor for iridium over rhodium which was achieved was $4.92 \times 10^5$. Even after shaking with the organic solvent, the volumes of clean water contained only traces of base metal species.

EXAMPLES 24 TO 30

The procedure of Example 2 was repeated except that the solvent used was 2,6-dimethyl-4-heptanone and the concentration of extractant was 0.5M. In Examples 24 to 26 and 30 various extractants as specified in Table 7 were used instead of N-(n-octyl)isooctadecanamide. The results obtained are shown in Table 7.

TABLE 7

| EXAMPLE | Extractant | $D_A^O$ Pt | $D_A^O$ Pd | Separation Factor |
|---|---|---|---|---|
| 24 | N—(n-dodecyl)isotridecanamide | 12.3 | 0.4 | 30.7 |
| 25 | N—(n-octyl)isostearanamide* | 15.9 | 0.7 | 22.7 |
| 26 | N—(isononyl)isotridecanamide | 13.1 | 0.4 | 32.7 |
| 27 | N—(n-octyl)isodecanamide | 12.9 | 0.5 | 25.8 |
| 28 | N—(isotridecyl)isotridecanamide | 11.9 | 0.3 | 40.0 |
| 29 | N—(n-octyl)isooctadecanamide | 4.16 | 0.1 | 41.6 |
| 30 | N—(isononyl)isodecanamide | 21.1 | 0.8 | 26.4 |

*Made from so-called isostearic acid supplied as "Emersol" 371.

We claim:

1. An organic solvent extraction process for the separation of a precious metal component in an aqueous acidic phase which contains said precious metal component and at least one other metal component selected from precious metal and base metal components, said precious metal component being selected from the group consisting of gold, silver, platinum, ruthenium, rhodium, palladium, osmium and iridium, and said base metal component being selected from the group consisting of iron, copper, nickel, selenium, tellurium and antimony, said process comprising contacting the aqueous acidic phase with an organic solvent phase containing dissolved therein an extractant which is a mono-N-substituted amide.

2. A process according to claim 1 wherein the extractant has the formula R'—CO—NH—R where R' and R may be the same or different and are straight chain alkyl, branched alkyl, alicyclic, aralkyl or aryl groups which contain at least six carbon atoms.

3. A process according to claim 2 wherein R' is an alkyl group containing 8 to 25 carbon atoms.

4. A process according to claim 2 or claim 3 wherein R' is an iso-alkyl group provided that the iso-alkyl group does not contain a tertiary carbon atom.

5. A process according to claim 1 wherein the extractant has the formula R"—CO—NH—R'" where the R" group is a branched chain alkyl group having from 8 to 25 carbon atoms and the R'" group is a substituted or unsubstituted straight chain, branched chain or cyclic alkyl group having from 3 to 18 carbon atoms or any aralkyl or aryl group.

6. A process according to claim 1 in which the aqueous acidic phase comprises hydrochloric acid in a concentration of from 3 to 12 molar.

7. A process according to claim 1 wherein the aqueous acidic solution contains platinum and at least one other platinum group metal and is subjected to a reduction which ensures that any platinum group metal other than platinum is predominantly in an oxidation state which does not interact with the extractant whereby platinum having an oxidation state of 4 is at least partially separated from other platinum group metals.

8. A process according to claim 7 wherein after separation of the platinum, the aqueous acidic phase is subjected to an oxidation which converts iridium having an oxidation state of 4 whereby the iridium can be separated into an organic solvent phase containing said extractant.

9. A process according to claim 1 wherein the organic solvent phase containing precious metal species separated from the aqueous acidic phase is subsequently contacted with an aqueous phase which is less acidic than the aqueous acidic phase whereby precious metal is recovered from the organic phase into the less acidic aqueous phase.

* * * * *